No. 860,821. PATENTED JULY 23, 1907.
M. PIEPER.
STAND OR SUPPORTING BASE FOR SKITTLES.
APPLICATION FILED AUG. 27, 1906.

Witnesses. Inventor.
Matthias Pieper.

UNITED STATES PATENT OFFICE.

MATTHIAS PIEPER, OF BLANKENESE, GERMANY.

STAND OR SUPPORTING-BASE FOR SKITTLES.

No. 860,821.          Specification of Letters Patent.          Patented July 23, 1907.

Application filed August 27, 1906. Serial No. 332,159.

*To all whom it may concern:*

Be it known that I, MATTHIAS PIEPER, a subject of the King of Prussia, and a resident of No. 16 Friedrichstrasse, Blankenese, in the Empire of Germany, have invented new and useful Improved Stand or Supporting-Base for Skittles, of which the following is a specification.

The present invention relates to an improved stand or supporting base for skittles.

Special objects of the invention are to render more efficient serviceable and durable in operation devices of the kind referred to.

With these ends in view the invention consists in the novel combination, arrangement and adaptation of parts, all as more fully hereinafter explained, shown in the accompanying drawings and then specifically set out in the appended claims.

Figure 1:
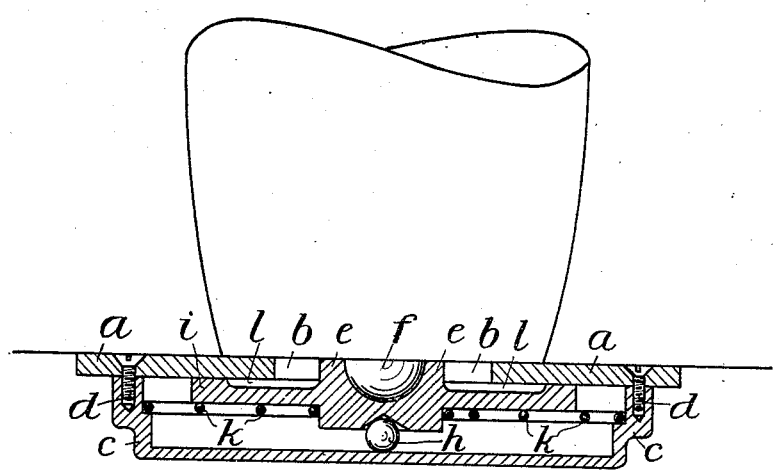
Figure 2:
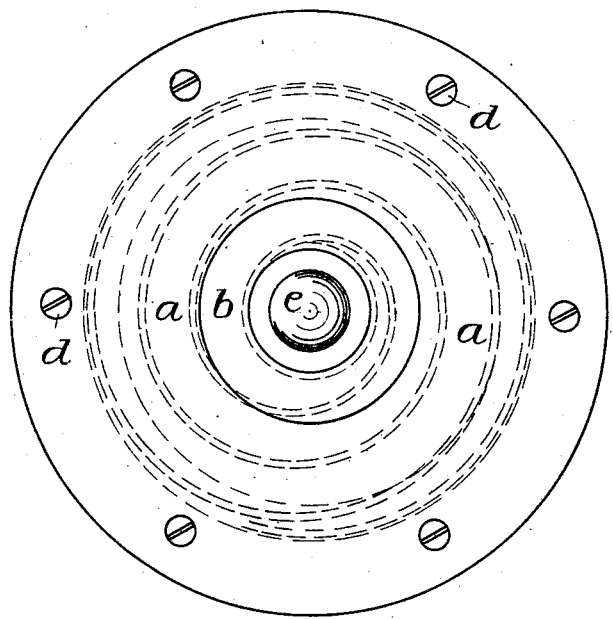

In the annexed drawings Figure 1 shows a central vertical section through the improved stand or supporting base, Fig. 2 is a top plan view of same.

In recent years a new kind of skittles has been largely adopted, especially in Germany. Said skittles are provided with a spring-influenced ball housed in a suitable bearing and protruding partly from the bottom surface of the skittles. This spring-influenced ball is destined to enter a corresponding socket in the stand or supporting base for the skittles, for the purpose of insuring and guaranteeing the proper setting up and correlative position of the skittles. Practical experience has demonstrated the following drawback in connection with skittles of the kind referred to. The impulse, which is to knock over the skittles, in overcoming the frictional resistance of the ball very soon wears the socket for the latter, widening same at its circumference as will be readily understood without further description. The advantage aimed at by the ball and socket joint will thus soon be obliterated.

My present invention has for its object the removal of the aforesaid drawback. It retains the original conditions of the ball and socket joint for an unlimited space of time and affords a reliable means for guaranteeing the proper setting up and correlative position of the skittles.

In carrying into practice my invention I employ the ordinary well known stand plates $a$, which may be of circular, square or polygonal shape. At the center of these plates $a$ I provide a circular hole or excision $b$ leading into a chamber at the underside of the plate $a$. Said chamber is formed by a cup $c$, secured to the plate $a$ by the screws $d$ or in any other suitable manner. Concentric with the hole $b$ is supported inside the chamber $c$ the socket $e$ for the ball $f$, which latter protrudes from the bottom surface of the skittle as shown in Fig. 1. The socket $e$, whose top surface is in alinement with the top surface of the stand plate $a$, bears against and is movable on the bottom of the cup $c$ by the agency of the central ball $h$. Said ball $h$ is received in a cavity at the underface of the socket $e$ concentric with the socket cavity for the ball $f$, as shown in the drawings. It is however to be understood that I may employ a plurality of bearing balls $h$, for instance three in number, for the same purpose.

The concentric position of the socket $e$ in regard to the hole $b$ in the stand plate $a$ is insured by means of a coiled spring $k$ properly supported in the cup $c$ and encircling with its central coil the socket $e$. A marginal annular flange $i$ of the socket extends under the plate $a$, against which it bears, so as to afford a means for recti-linearly guiding the socket $e$ in its movements.

When the skittle is being knocked over either by the impulse of the ball thrown or by the fall of a neighboring skittle, it shows through the aforesaid impact the tendency of lateral movement before tumbling over. This lateral movement being impeded in skittles of the hitherto known kind by the ball and socket joint at the skittle stand, the impact and the considerable frictional resistance renders a premature wear of the socket $e$ unavoidable. Such wearing of the socket $e$ is prevented in my hereinbefore described stand or supporting base by the movability of same in every direction rectilinearly inside the cup $c$, while on the other hand the advantage aimed at by the ball and socket joint is retained, since the socket automatically returns to its original pre-determined position under the influence of the spring $k$, when the skittle has fallen.

Dust and dirt entering the cup $c$ through the hole $b$ is received and collected in the channel $l$ provided in the annular flange $i$ of the socket $e$ and is thus kept away from the bearing surface of the flange $i$ against the under face of the plate $a$.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims, or of mechanical equivalents to the structure set forth.

What I do claim as my invention, and desire to secure by Letters Patent, is:

1. An improved stand or supporting base for skittles having a spring-influenced ball protruding centrally from their under face, comprising a plate $a$ provided with a central bore $b$, a separate socket $e$ for the ball protruding from the skittle, said socket being movable in every direction rectilinearly in regard to the plate $a$ and a spring for automatically returning the aforesaid socket $e$ to its original position, substantially as described and shown and for the purpose set forth.

2. An improved stand or supporting base for skittles having a spring-influenced ball protruding centrally from their under face, comprising a plate $a$ provided with a central bore $b$, a cup $c$ secured to the aforesaid plate $a$ at the underside thereof, a separate socket $e$ for the ball protruding from the skittle, said socket being guided inside the cup $c$ and being movable in every direction rectilinearly in regard to the plate $a$ and a spring for automatically returning the aforesaid socket to its original position, substantially as described and shown and for the purpose set forth.

3. An improved stand or supporting base for skittles having a spring-influenced ball protruding centrally from their under face, comprising a plate $a$ provided with a central bore $b$, a cup $c$ secured to the aforesaid plate $a$ at the underside thereof, a separate socket $e$ for the ball protruding from the skittle, means for guiding the socket on the bottom of the cup $c$, means for rectilinearly guiding the socket on the underside of the plate $a$, and springs inside the cup $c$ for acting upon the socket $e$, substantially as described and shown and for the purpose set forth.

4. An improved stand or supporting base for skittles having a spring-influenced ball protruding centrally from their under face, comprising a plate $a$ provided with a central bore $b$, a cup $c$ secured to the aforesaid plate $a$ at the underside thereof, a separate socket $e$ for the ball protruding from the skittle, a bearing ball $h$ interposed between the socket and the bottom of the cup $c$, means for rectilinearly guiding the socket at the underside of the plate $a$ and springs inside the cup for acting upon the socket $e$, substantially as described and shown and for the purpose set forth.

5. An improved stand or supporting base for skittles having a spring-influenced ball protruding centrally from their under face, comprising a plate $a$ provided with a central bore $b$, a cup $c$ secured to the aforesaid plate $a$ at the underside thereof, a separate socket $e$ for the ball protruding from the skittle, an annular flange $i$ of the socket extending beneath the plate $a$ and bearing against the underside thereof, means for guiding the socket on the bottom of the cup $c$, and springs inside the cup $c$ for acting upon the socket $e$, substantially as described and shown and for the purpose set forth.

6. An improved stand or supporting base for skittles having a spring-influenced ball protruding centrally from their under face, comprising a plate $a$ provided with a central bore $b$, a cup $c$ secured to the aforesaid plate $a$ at the underside thereof, a separate socket $e$ for the ball protruding from the skittle, means for guiding the socket on the bottom of the cup $c$, means for rectilinearly guiding the socket on the underside of the plate $a$, and a coiled spring $k$ bearing against the circumferential wall of the cup $c$ and encircling with its central coil the socket $e$, substantially as described and shown and for the purpose set forth.

7. An improved stand or supporting base for skittles having a spring-influenced ball protruding centrally from their under face, comprising a plate $a$ provided with a central bore $b$, a cup $c$ secured to the aforesaid plate $a$ at the underside thereof, a separate socket $e$ for the ball protruding from the skittle, an annular flange $i$ of the socket extending beneath the plate $a$ and bearing against the underside thereof, an annular channel $l$ provided in the top surface of the aforesaid flange $i$ adapted to serve as a dust collector, means for guiding the socket on the bottom of the cup $c$, and springs inside the cup $c$ for acting upon the socket $e$, substantially as described and shown and for the purpose set forth.

In witness whereof I have hereunto signed my name this 9th day of August 1906, in the presence of two subscribing witnesses.

MATTHIAS PIEPER.

Witnesses:
IDA CHRIST. HAFERMANN,
OTTO W. HELLMRICH.